United States Patent [11] 3,572,447

| [72] | Inventors | Reginald W. Pauley<br>Belle Mead;<br>Leo Kramer, Skillman, N.J. |
|---|---|---|
| [21] | Appl. No. | 775,011 |
| [22] | Filed | Nov. 12, 1968 |
| [45] | Patented | Mar. 30, 1971 |
| [73] | Assignee | Ingersoll-Rand Company<br>New York, N.Y. |

[54] TORQUE MEASURING SYSTEM FOR IMPACT WRENCH
10 Claims, 13 Drawing Figs.

[52] U.S. Cl. .................................................. 173/12, 173/20, 318/432
[51] Int. Cl. .................................................. B23q 5/00
[50] Field of Search .................................. 173/12, 20; 318/432, 433; 81/52.3, 52.4

[56] References Cited
UNITED STATES PATENTS

| 2,973,067 | 2/1961 | Eddy, Jr. ........................ | 173/12 |
| 2,808,916 | 10/1957 | Johnson ........................ | 173/20 |
| 3,174,559 | 3/1965 | Vaughn ........................ | 173/12 |
| 3,174,606 | 3/1965 | Hornschuch et al. ......... | 173/12 |

*Primary Examiner*—James A. Leppink
*Attorneys*—Carl R. Horten and David W. Tibbott ABSTRACT: An impact wrench including a resilient member disposed between the motor and the fastener driving spindle and adapted to yield under torque to measure the torque load. The torque load on the resilient member is measured by means such as an electrical strain gauge which operates a valve to stop the tool in response to the rise of the torque load to a selected magnitude.

Patented March 30, 1971

INVENTORS
REGINALD W. PAULEY
LEO KRAMER
BY
David W. Tibbotts
ATTORNEY

Patented March 30, 1971

INVENTORS
REGINALD W. PAULEY
LEO KRAMER
BY
David W. Tilhott
ATTORNEY

Patented March 30, 1971

INVENTORS
REGINALD W. PAULEY
LEO KRAMER
BY
David W. Tillott
ATTORNEY

TORQUE MEASURING SYSTEM FOR IMPACT WRENCH

BACKGROUND OF THE INVENTION

This invention relates to rotary impact tools having a torque limiting means which can be adjusted to vary the maximum magnitude or amount of torque applicable by such tools to a fastener, such as a nut or the like.

A conventional rotary impact tool having an adjustable torque limiting means is disclosed in the U.S. Pat. No. 2,822,677, issued Feb. 11, 1958 to H. C. Reynolds. This tool includes an axially extending torsion bar spring which is utilized to transmit rotary impacts to a fastener. The torsion spring is wound or prestressed to a predetermined value of torque corresponding to the maximum torque load that is to be transmitted by the torsion spring to the fastener. By being prestressed, the torsion spring transmits torque loads as a rigid nondeflecting coupling so long as the transmitted torque is equal to or less than the prestressed torque of the torsion spring. When the impact torque load applied to the torsion spring by the rotary impact tool exceeds the prestressed torque of the torsion spring, the torsion spring begins acting as a spring, instead of a rigid coupling, and deflects an additional amount and then rebounds to absorb and dissipate the excessive impact torque load without transmitting it to the fastener. This torsion bar is commonly known as a "prestressed" or "-preloaded" torsion bar. SUMMARY OF THE INVENTION A principal object of this invention is to provide a novel torque measuring system for an impact wrench which is accurate and reliable.

Other important objects are: to provide an electrical system for sensing a torque load in an impact wrench and shutting off the wrench motor in response to a selected torque load; and to provide an accurate torque measuring system for use on an impact wrench which is not subjected to the high torque impulses that are utilized in conventional torque measuring systems for impact wrenches.

In general, the objects of this invention are attained by locating a resilient member between the motor and the impact mechanism so that the resilient member carries the torque load transmitted by the motor, sensing the torque magnitude on the resilient member by measuring its strain, using a strain gauge or other means, and using this strain signal to signal the end of the fastener turning operation. One way of using the signal is for it to operate a shutoff mechanism for the wrench motor.

Another feature of this invention is the concept of using an electrical strain gauge to measure the torque load on an impact wrench. The strain gauge can be connected to a resilient member located either between the motor and impact mechanism or between the anvil and the fastener.

BRIEF DESCRIPTION OF DRAWING

The invention is disclosed in the accompanying drawings wherein.

DESCRIPTION OF PREFERRED EMBODIMENTS

Figures 1, 2, 3, 4, 5:
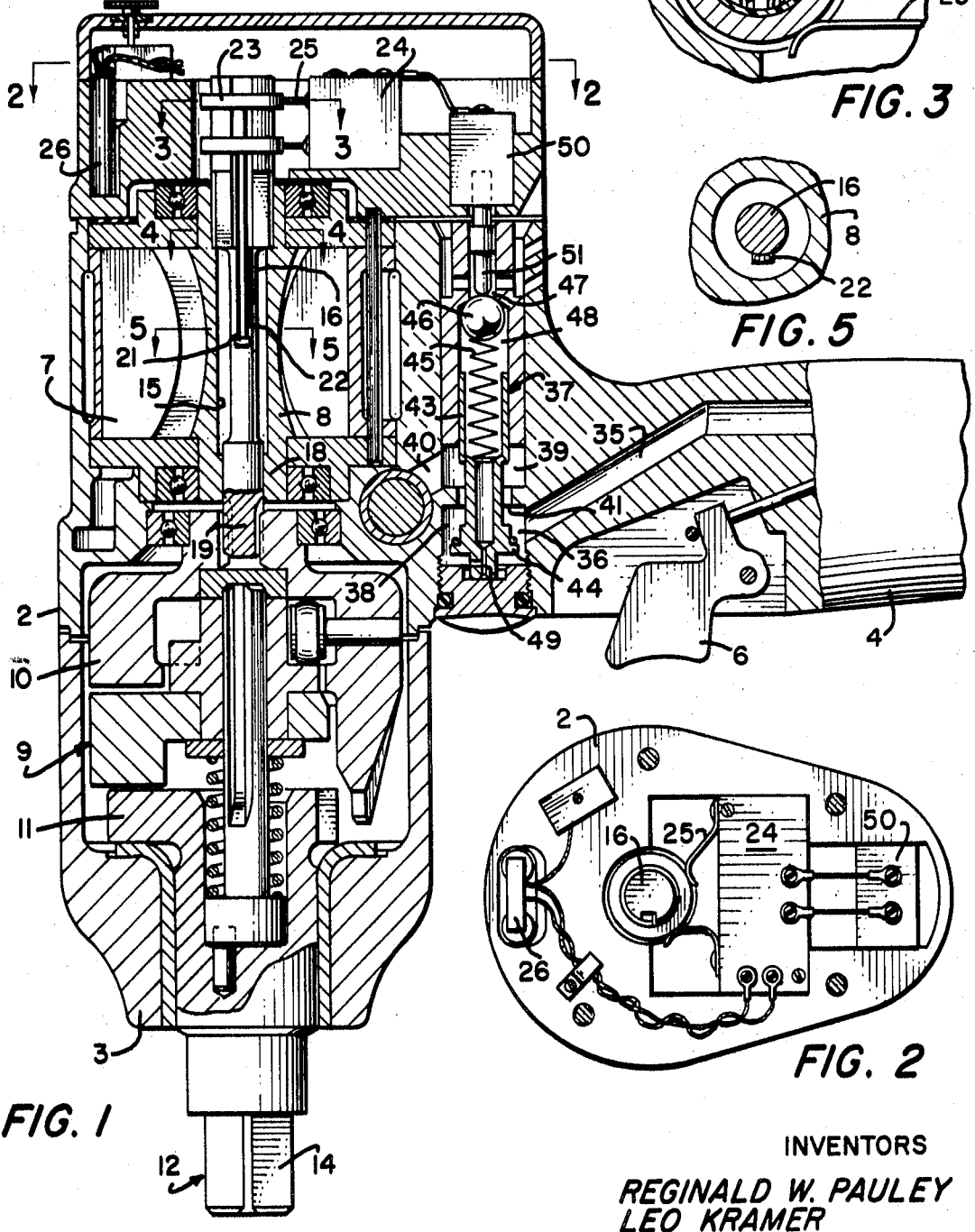
FIG. 1 is a cutaway sectional view of an impact wrench embodying the invention.
FIGS. 2 to 5 are sections taken respectively along lines 2–2, 3–3, 4–4 and 5–5 in FIG. 1.
Figure 7:
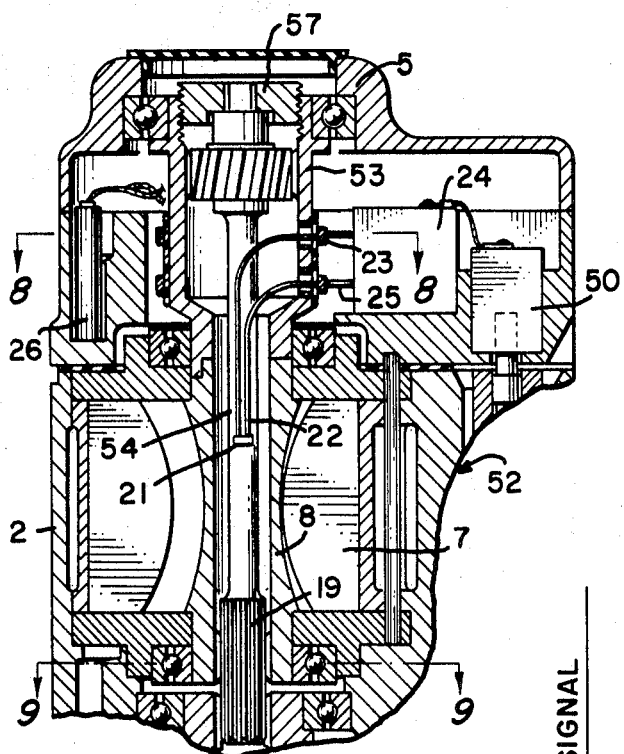
FIG. 7 is a fragmentary axial section of a second embodiment of impact wrench embodying the invention and using a preloaded torsion bar for measuring torque.
Figure 8:
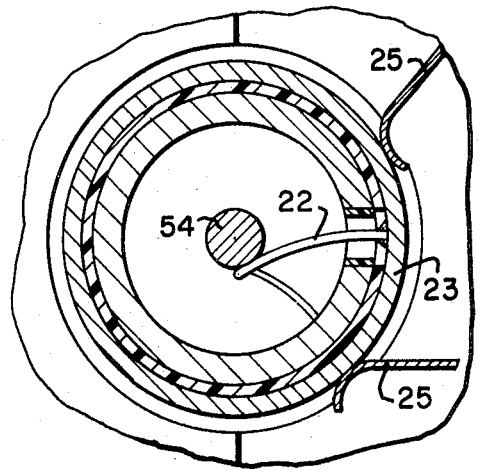
FIG. 8 is a fragmentary section taken on line 8–8 of FIG. 7.

The firs embodiment of the impact tool or wrench 1 shown in FIGS. 1 to 3 includes a casing 2 having a front nose 3, a pistol-shaped handle portion 4 and a rear cap 5. The handle 4 carries a trigger 6 which is connected to a throttle valve (not shown) and is operative to feed fluid pressure to the motor 7. The motor 7 includes a hollow motor shaft 8 which is connected to a conventional impact mechanism 9 including a hammer 10 and an anvil 11.

The impact mechanism 9 delivers periodic rotary impacts to the spindle 12 in a manner which is well-known in the impact wrench art. The wrench spindle 12 carries a plurality of flats 14 on its outer end and is adapted to fit in a conventional wrench socket (not shown). All of the foregoing structure is conventional and, for that reason, is not described in detail.

The motor shaft 8 is hollow to provide a bore 15. A torsionally resilient bar or shaft 16 is contained in the bore 15 and is rigidly anchored at its rear end to the rear end of the hollow motor shaft 8 by being provided with a square rear end 17 seated in a corresponding square socket provided in the rear end of the motor shaft 8.

The torsion bar 16 extends forwardly through the bore 15, is supported in a bearing 18 provided in the forward end of the hollow shaft 8 and includes a splined forward end 19 interfitting in a splined opening provided in the hammer 10. With the foregoing structure, the motor shaft 8 drives the hammer 10 through the torsion bar 16 which carries the torque loads placed on the motor 7. As these torque loads rise, the torsion bar 16 will resiliently twist (strain) in proportion to the torsional stress carried by the torsion bar.

This twist or strain is measured by a conventional strain gauge 21 attached to the torsion bar 16. The strain gauge 21 is connected to a pair of electrical conductors 22 which extend rearwardly along the torsion bar 16 and are attached to a pair of conductor rings 23 mounted on the rear end of the torsion bar 16. A solid state amplifier 24 is mounted at the rear end of the wrench 1, covered by the rear cap 5 of the casing 2, and has respective brushes or springs 25 riding on the conductor rings 23 for electrically interconnecting the amplifier 24 with the strain gauge 21 Also mounted within the rear end of the tool is a battery pack 26 for supplying electrical current to the amplifier 24. The amplifier 24 receives the electrical signal from the strain gauge 21 and amplifies it to a higher voltage level. The strain gauge can be a type that creates its own electrical signal under strain or can be the type that varies the flow of electrical current in response to strain. Means is shown in FIG. 1 for utilizing the signal provided by the amplifier 24 to automatically stop the impact wrench 1. This means is described below.

The trigger 5 controls the feeding of fluid pressure to an inlet port 35 opening into a chamber 36 containing a shutoff valve means 37 which is normally open and is operative, when closed, to shutoff the flow of pressure fluid to the tool motor 7. The chamber 36 is divided into an inlet space 38, a cylinder 39 and an outlet port 40 extending to the motor 7. The valve means 37 includes a valve seat 41 located between the inlet space 38 and the cylinder 39. As a result of this arrangement, pressure flows through the inlet port 35, the inlet 38, the valve seat 41, the cylinder 39, and the outlet port 40 to the motor 7.

A spool valve 43 is slidably mounted in the cylinder 39. The valve 43 includes a valve head portion 44 adapted to seat over the valve seat 41 to close off the inlet space 38 from the cylinder 39. A spring 45 is mounted in the cylinder 39 to bias the valve 43 to a normally open position, as shown in FIG. 1. The lower end of the spring 45 seats against a ball 46 which closes an exhaust port 47 leading to the atmosphere. The portion of the cylinder 39 containing the spring 45 and ball 46 is termed a pilot chamber 48.

The valve 43 contains a small leak passage 49 extending between the inlet space 38 and the pilot chamber 48 containing the ball 46. As a result of the leak passage 49, fluid pressure applied to the inlet space 38 will slowly flow into the pilot chamber formed in the cylinder 39 at the lower end of the valve 43. After fluid pressure is applied to the inlet space 38, the sudden exhausting of the pilot chamber 48 will result in the creation of a differential fluid pressure acting across the valve 43 causing the valve 43 to be quickly closed against the spring 45.

A solenoid 50 is electrically connected to the amplifier 24 and is located where its plunger 51 will engage and open the pilot ball 46 when actuated by the amplifier 24. Hence, the amplifier 24 and strain gauge 21 can be adjusted to actuate the solenoid 50 to exhaust the pilot chamber 48 when the torque load on the torsion bar 16 rises to a predetermined magnitude. The exhausting of the pilot chamber 48 will close the valve 43 to shut off air flow to the motor immediately.

Figure 6:
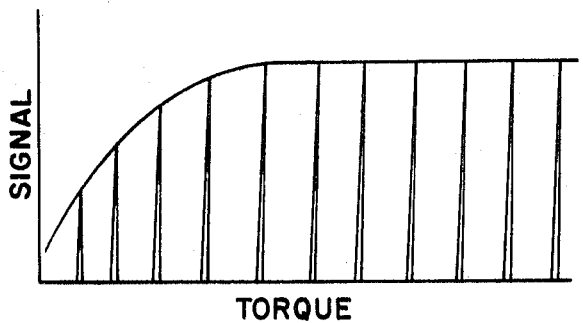
FIG. 6 is a curve showing the relation between signal output and torque output of the wrench of FIG. 1.
Figure 9:
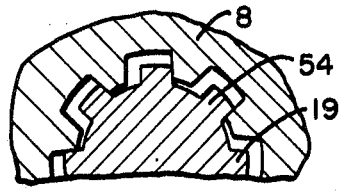
FIG. 9 is a fragmentary section taken on the line 9–9 of FIG. 7.

FIG. 6 shows the nature of the electrical signals provided by the strain gauge 21. FIG. 6 is a curve having an ordinate representing signal voltage and an abscissa representing torque load on a fastener. The pulses indicate each impact blow. In the embodiment of FIG. 1, the signal pulses increase in height substantially as the torque increases with the pulse height flattening off at the higher torque magnitudes. As a result, the amplifier 24 can be adjusted to signal the solenoid 50 to stop the tool motor when the signal pulses reach a selected height, which will indicate that the torque load on the fastener has reached a known magnitude.

The motor-stopping pulse height will be selected to correspond with the desired motor-stopping torque.

The second embodiment of impact wrench 52 is similar to that of FIG. 1 with the exception that it uses a torsion bar having a preload. The reference numbers used in the first embodiment will be used in describing similar parts in this embodiment.

The hollow motor shaft 8 is provided with a rearward extension 53 and a torsion bar 54 is contained in the shaft 8 with its forward end locked by splines 55 to corresponding flutes contained in the forward end of the motor shaft. The splines 55 allow the torsion bar 54 to slide forwardly in the flutes for a limited distance. The rear end portion of the torsion bar 54 carries helical gear teeth 56 engaging corresponding gear on the shaft extension 53. The rear end face of the torsion bar 54 engages a screw 57 threaded into the extension 53, so that the forward movement of the screw 57 forces the torsion bar 54 forward and twists it to increase the preload on the torsion bar 54. By being prestressed or preloaded, the torsion bar 54 will transmit a torque load without further twisting until the transmitted torque load exceeds the prestressing torque magnitude. This principle is explained in the aforementioned U.S. Pat. No. 2,822,677 to H. C. Reynolds.

The second embodiment 52 includes a strain gauge 21, conductor rings 23, amplifier 24 and solenoid 50, arranged substantially the same as in the first embodiment.

Figure 10:
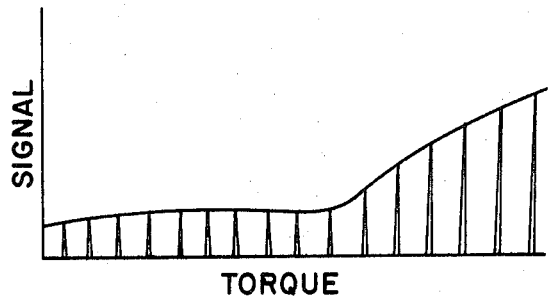
FIG. 10 is a curve showing the signal output of the wrench shown in FIG. 7.

The curve in FIG. 10 illustrates the difference between the first and second embodiments. In the second embodiment, the signal voltage pulse height remains the same as the fastener torque increases until the torque load exceeds the prestressing torque, whereupon the signal pulse begins increasing. This type of signal is more desirable than that shown in FIG. 6 because the change in the curve is more abrupt and distinct so that the point of stopping the motor can be more accurate.

Figure 11:
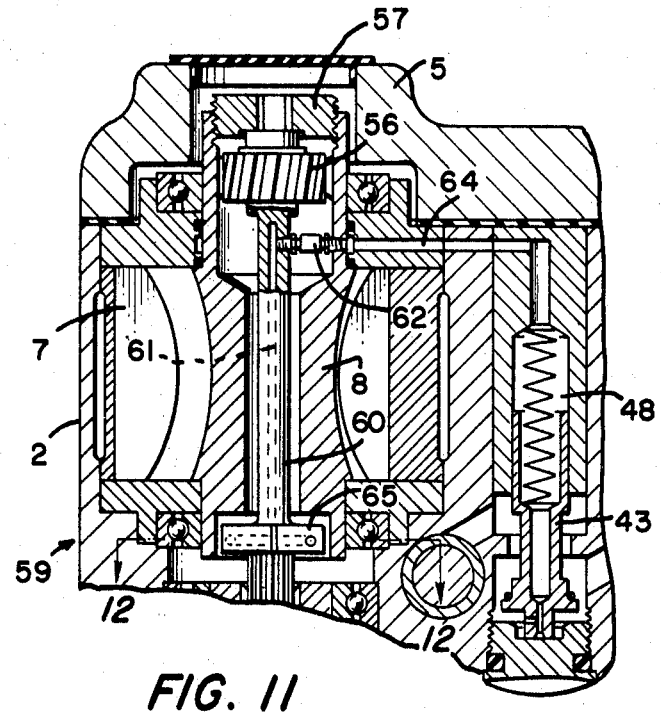
FIG. 11 is a fragmentary axial section of a third embodiment of the invention.
Figure 13:
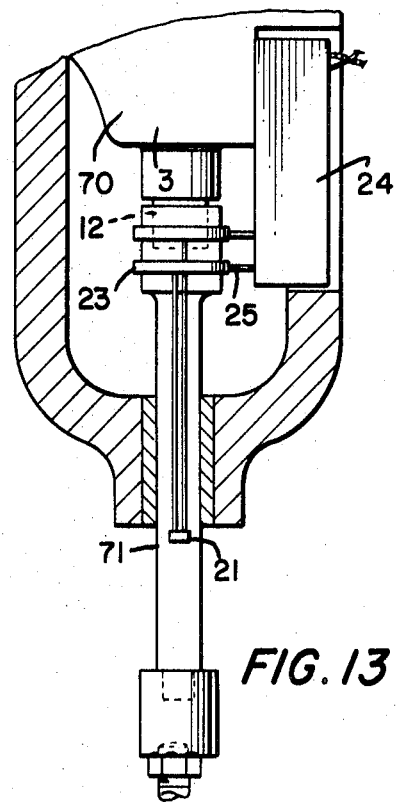
FIG. 13 is a fragmentary elevation of a fourth embodiment of the invention.
Figure 12:
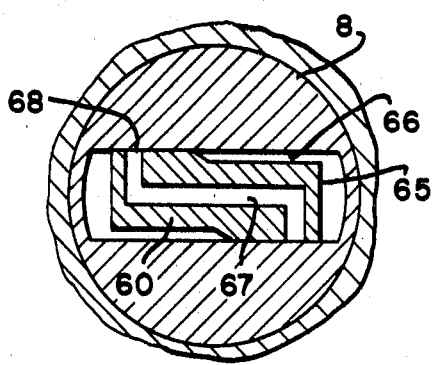
FIG. 12 is a fragmentary section taken on the line 12–12 in FIG. 11.

The third embodiment of impact wrench 59 shown in FIGS. 11 and 12 is similar to the second embodiment with the exception that the electrical strain gauge has been eliminated for an automatic air bleed system to sense torque and to stop the motor 7 when the torque load rises to a selected magnitude.

The torsion bar 60 contains a central passage 61 connected by a short hose 62 to a port 63 provided in the extension 53. The port 63 is connected by a rotary joint to a passage 64 that runs to the pilot chamber 48 of the motor shutoff valve means 37.

The forward end of the torsion bar 60 is terminated as a Z-shaped cross section 65 locked between a closed-end slot provided in the motor shaft 8 forming a pair of parallel surfaces 66. The Z-shaped cross section 65 contains a cross passage 67 that is connected to the central passage 61 and terminates in bleed ports 68 located at the end of each leg of the Z-shaped cross section.

Normally, the bleed ports 68 are sealed by being pressed against the surfaces 66 of the motor shaft 8, due to the twist or prestress applied to the torsion bar 60. This condition will remain until the torque on the torsion bar 60 exceeds the prestressing torque load applied by the helical gear teeth 56 and the adjustment screw 57. As soon as the bleed ports are opened, they vent the air from the pilot chamber 48, causing the spool valve 43 to close to stop the air flow to the motor 7.

The fourth embodiment shows an impact wrench 70 having a torsion bar 71 mounted on its spindle 12 and carrying a strain gauge 21 connected by conductors 22 to conductor rings 23 attached to the upper portion of the torsion bar 71. An amplifier 24 is attached to the nose 3 of the wrench 70 and carries brushes 25 engaging the conductor rings 23. The amplifier 24 actuates a solenoid 50 (not shown) to stop the wrench motor in response to a predetermined torque load in the same manner as in the first embodiment.

While several embodiments of the invention are shown and described in detail, this invention is not limited simply to the specifically described embodiments, but contemplates other embodiments and variations which utilize the concepts and teachings this invention.

We claim:

1. A system for measuring the torque output in an impact wrench including a motor and a rotary impact mechanism connected to a spindle adapted to deliver a series of rotary impacts to a fastener, the invention comprising:
    a flexible member interconnected between the motor and spindle and operative to flex in direct proportion to the change of torque load on the spindle; and
    an electrical strain gauge attached to said flexible member and operative to measure the strain in said flexible member and to create an electrical signal in response to said strain to indicate the torque on said spindle.

2. The system of claim 1 including; means responsive to said signal to stop said motor upon the torque load on said spindle rising to a predetermined torque level.

3. The system of claim 1 wherein; said flexible member is interconnected between the motor and the impact mechanism.

4. The system of claim 1 wherein; said flexible member is interconnected between the impact mechanism and said spindle.

5. The system of claim 1 wherein; said flexible member is maintained under an adjustable predetermined torque load prior to the use of said wrench.

6. The system of claim 1 wherein; said electrical strain gauge is connected by conductors to a rotary electrical connection and an amplifier.

7. The system of claim 6 wherein; said amplifier is operative to shut off the wrench motor in response to the signal received from said strain gauge.

8. The system of claim 7 wherein; said amplifier operates a fluid valve means to shut off the motor.

9. A system for measuring the torque output in an impact wrench including a motor, a rotary impact mechanism and a spindle adapted to deliver a series of rotary impacts to a fastener, the invention comprising:
    a yieldable member interconnected between the motor and the impact mechanism and adapted to yield in response to the torque load on the spindle;
    resilient means opposing the yielding of said yieldable member under a torque load;
    means applying a preload to said resilient means preventing said yieldable member from yielding further until the torque load on said spindle rises above a predetermined value; and
    means for creating an electrical signal in response to further yielding of said yieldable member thereby indicating that the torque load has risen above said predetermined torque load.

10. The system of claim 9 wherein; said signal is created by an electrical strain gauge measuring the strain of said yieldable member.